United States Patent

[11] 3,607,998

[72] Inventor Walter R. Goodridge
     Birch Groves, New Milford, Conn. 06776
[21] Appl. No. 814,121
[22] Filed Apr. 7, 1969
[45] Patented Sept. 21, 1971

[54] METHOD FOR PRODUCING HOLLOW ARTICLES
     10 Claims, 3 Drawing Figs.

[52] U.S. Cl. .................................................. 264/24,
     264/121, 264/124, 264/314
[51] Int. Cl. ....................................................... B29c 13/04,
     B29f 5/02
[50] Field of Search ........................................... 264/309,
     314, 121, 124, 24

[56] References Cited
     UNITED STATES PATENTS
     3,291,882  12/1966  Warner ........................ 264/309
     2,920,679  1/1960   Sittel ............................ 264/24
     2,335,300  12/1943  Neff .............................. 264/314
     3,154,530  10/1964  Mullen ......................... 260/94.9
     3,389,199  6/1968   Bushnell ....................... 264/45

OTHER REFERENCES

Modern Plastics, " The Army Helmet Liner," Vol. 19, Number 9, May 1942 (P 35–38)

Primary Examiner—Donald J. Arnold
Assistant Examiner—Richard R. Kucia
Attorney—Peter L. Costas ABSTRACT: A generally hollow article is produced by coating a flexible bladder with material, integrating the material into a unitary structure, and thereafter removing the bladder therefrom. The apparatus includes coating means to form a fluidized mass of integrable particles, a flexible bladder which provides the form for the article, and means to cause adherence of the material to the bladder.

PATENTED SEP 21 1971

INVENTOR.
WALTER R. GOODRIDGE

BY Peter L. Costas

ATTORNEY

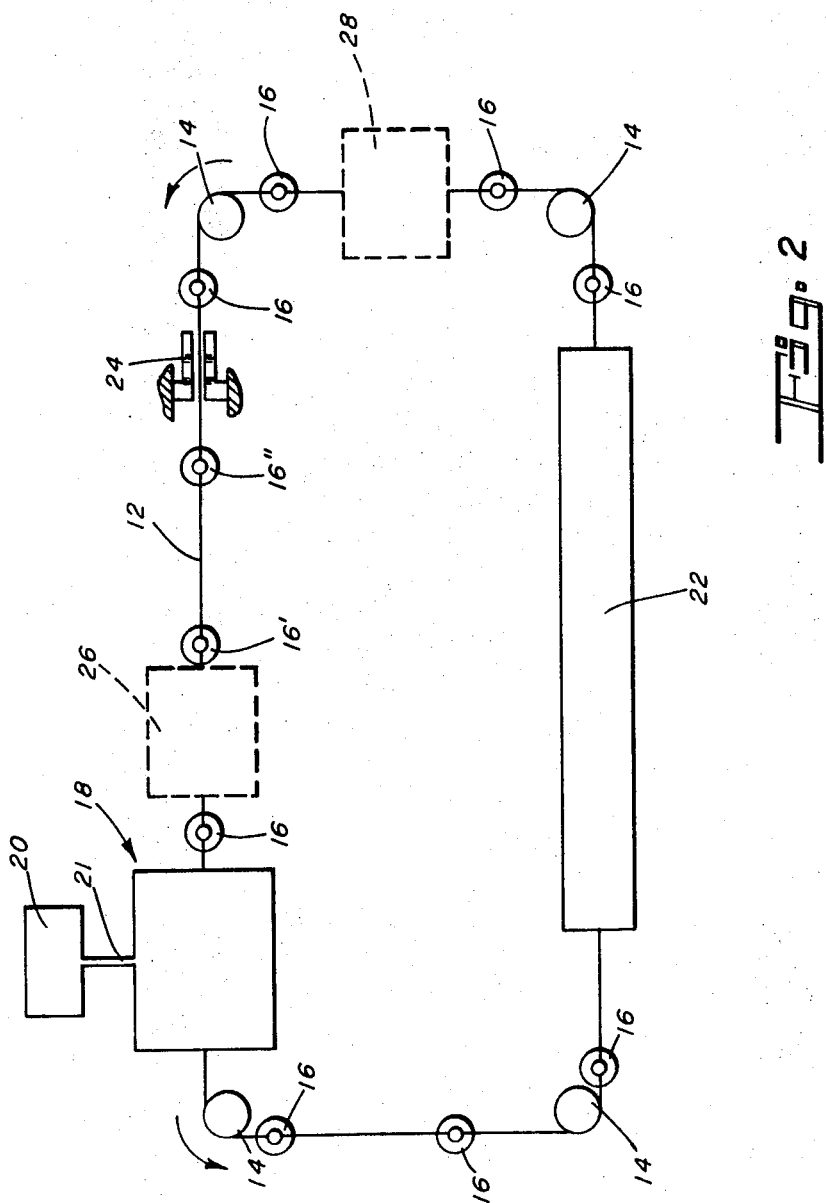

METHOD FOR PRODUCING HOLLOW ARTICLES

BACKGROUND OF THE INVENTION

Although numerous techniques have been devised for producing articles that are hollow and/or intricate in design from a wide variety of materials, the known methods are generally subject to one or more disadvantages, and most often are not entirely satisfactory. Among these disadvantages are the expense and the complicated nature of the equipment which must be used and the complexity which the method itself commonly entails. As a result, hollow and/or intricate articles are currently produced by methods which tend to be disproportionate in expense and/or effort to the value of the finished article.

One common manufacturing technique involves the production of the article in a plurality of sections for subsequent assembly, since the individual sections can be produced using relatively inexpensive equipment which may be quite simple in design. However, the articles so produced necessarily have seams, which are usually undesirable both aesthetically and more significantly, from the standpoint of the potential leakage which can occur therethrough if the sections are imperfectly assembled (e.g., when bottles are produced by such a method). In addition, forming an article in sections necessarily involves more steps than are required if the article is integrally formed, and this is of course also less desirable.

In addition to the foregoing factors, certain materials which possess valuable properties are not feasible for the production of molded articles because they are not well suited for processing by conventional techniques. For example, a number of known resins exhibit undesirably high viscosities at practical molding temperatures and/or are subject to relatively high levels of degradation under the conditions of molding.

Accordingly, it is an object of present invention to provide a method for producing generally hollow articles which is rapid, facile and relatively inexpensive.

It is also an object of the invention to provide a method involving a limited number of operations by which articles of relatively complex design can be produced with controlled wall thicknesses and without seams.

Another object is to provide a method for producing such articles utilizing inexpensive materials which may be difficult or infeasible to fabricate utilizing conventional molding techniques.

A further object is to provide a method by which orientation of generally hollow articles, made of orientable resins, can readily be accomplished.

A still further object is to describe apparatus for accomplishing the foregoing objects, which apparatus is simple in design and relatively inexpensive.

SUMMARY OF THE INVENTION

It has now been found that the foregoing and related objects can be readily attained in a method wherein a fluidized mass of material is formed and at least a portion of the periphery of a flexible bladder is contacted with some of the fluidized mass of material under conditions causing the material to adhere thereto. Thereafter, the material is integrated into a cohesive, unitary, generally hollow article and the bladder is a least partially collapsed and removed from the article.

Preferably, the material of the fluidized mass is in the form of integrable particles without any added substances, and most desirably the material is a thermoplastic resin. In one embodiment of the invention, the fluidized mass is a fluidized bed of thermoplastic particles and the bladder is preheated to an elevated temperature and introduced into the bed, the temperature of preheating being sufficient to at least partially fuse the particles and cause adherence thereof upon contact with the bladder. In such a method a cooling step is also included to solidify the fused particles into the cohesive article prior to removal of the bladder.

In a second embodiment, the fluidized mass is a cloud of electrically charged particles and the bladder is electrically charged or grounded to provide a polarity effectively opposite to that of the particles, the particles thereby being attracted to the bladder and caused to adhere thereto. Such a method advantageously includes the steps of heating the particles on the bladder to a temperature above the fusion point of the material and subsequently cooling the fused particles to form the article.

The apparatus employed for producing articles in accordance with the invention includes coating means for forming a fluidized mass of integrable particles, a flexible bladder form for the article and means operating on at least the bladder to cause adherence of the particles to at least a portion of the bladder. The means for rendering the bladder adherent to the particles may comprise heating means or a source of DC voltage. In the latter case, one pole of the voltage source is effectively attached to the bladder (which is electrically conductive) and the other pole is attached to the fluidized mass—forming means to charge the particles to a potential opposite to that of the bladder.

The apparatus may include an inflatable bladder and a pressure source which is connected to the bladder to effect the inflation thereof. It may also include means for integrating the particles adhered to the bladder such as an oven wherein particles of a heat-fusible material can be fused on the bladder into a cohesive, unitary, generally hollow article.

BRIEF DESCRIPTION OF THE DRAWING

FIG. 2 is a schematic diagram of one embodiment of apparatus employed in accordance with the invention.

DETAILED DESCRIPTION OF THE ILLUSTRATED EMBODIMENTS

Figure 1:
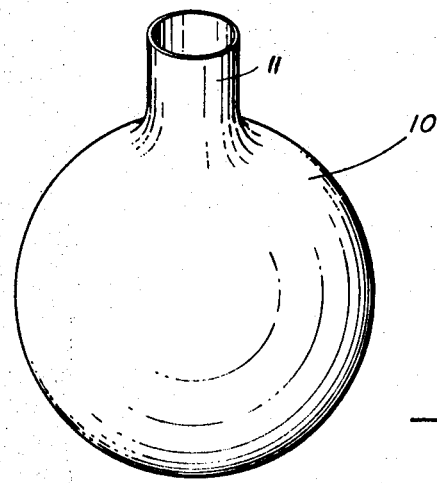
FIG. 1 is a perspective view of a Christmas tree ornament produced in accordance with the invention.

Turning now in detail to the appended drawings, FIG. 1 illustrates a Christmas tree ornament 10 which may be produced in accordance with the present invention and which is hollow with an open neck 11. One form of apparatus suited for the production of articles such as the ornament designated 10 is schematically illustrated in FIG. 2. The apparatus depicted in FIG. 2 includes a chain or like conveyor 12 which is mounted to move continuously about four suitable sprockets or pulleys 14 which define a generally rectangular path therefor in the direction indicated by the arrows. Positioned on the conveyor 12 are a multiplicity of forms 16 which are each adapted to produce the Christmas tree ornament illustrated in FIG. 1. The form 16' 16" is at the last stage thereof, although the apparatus illustrated operates continuously.

Initially, form 16' enters a coating station, generally designated by the numeral 18, which has an associated supply hopper 20 containing the coating material; a conduit 21 extends therebetween to transport the material from the hopper 20 into the station 18. The coated form 16' progresses from the coating station 18 in which the coating material is deposited thereon and adhered thereto, into the oven 22, wherein it is subjected to elevated temperatures to integrate or fuse the particles, it being assumed for the purpose of description that the particles are of a heat-fusible material. After exiting from the oven 22, the integrated coating is allowed to harden on the form and become unified into a cohesive structure, after which the form passes through the prongs of an inclined bifurcated device 24 to separate the article therefrom.

In optional embodiments (illustrated by dotted line representation), the apparatus includes a preheating oven 26 positioned upstream of the coating station 18 and a cooling chamber 28 positioned downstream of the oven 22. The preheating oven 26 is suitable when it is desirable to preheat the forms 16 to cause adherence of a heat-fusible powder thereto and the forms must have sufficient heat capacity to maintain a temperature high enough for fusion after preheating. Although it is usually possible to cool the formed article satisfactorily under ambient conditions after they exit from the oven 22, use of the cooling chamber 28 enhances the efficiency of cooling and decreases the time required.

Figure 3:
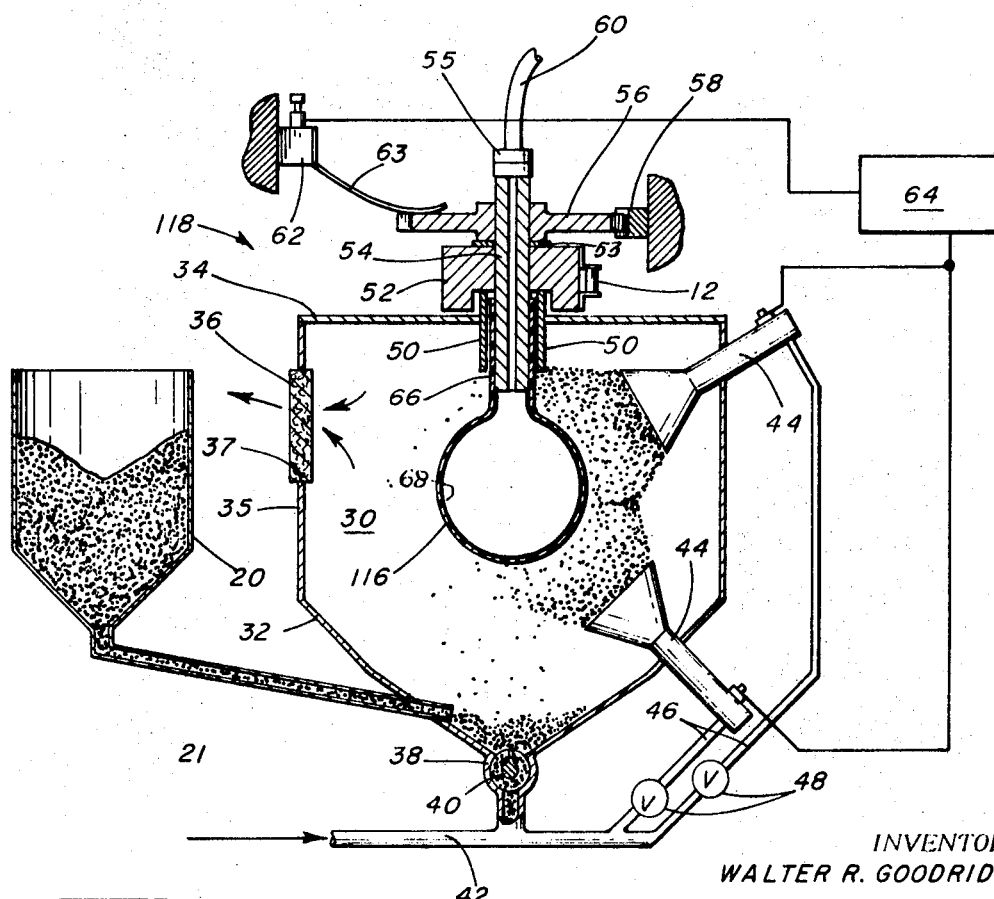
FIG. 3 is a partially diagrammatic representation of electrostatic coating means suitable for use to form articles of the type illustrated in FIG. 1.

Referring now specifically to FIG. 3, electrostatic coating means generally designated by the numeral 118 provides the coating station 18 of the apparatus described generally in FIG. 2. The coating means 118 includes an enclosed chamber 30 having a generally V-shaped bottom section 32 and a slotted top 34. The sidewall 35 above the bottom section 32 has an aperture 37 therein to relieve pressure in the chamber 30, and a filter element 36 is mounted in the aperture 37. Beneath the V-shaped section 32 is an elongated collection chamber 38 which is circular in cross section, and a screw conveyor 40 is rotatably seated in the chamber 38. Although it may not be apparent from the Figure, it should be appreciated that the collection chamber 38 extends along the length of the enclosed chamber 30 and that the screw 40 is utilized to convey powder which falls to the bottom of the enclosed chamber 30 along the length thereof and into the air chamber 42, which is mounted beneath the collection chamber 38.

The enclosed chamber 30 has two powder guns 44 mounted in the bottom section 32 and the sidewall 35 and directed inwardly toward the form 116 conveyed therethrough. An air hose 46 is connected to each of the guns 44 and communicates through a respective valve 48 with the air chamber 42. Air introduced into the air chamber 42 carries powder through the valves 48 (when they are open), into the guns 44 and toward the form 116.

Centrally located in the slotted top 34 of the enclosed chamber 30 is a pair of tracks or rails 50 which define an elongated slot therein, and bushing block 52 is suitably designed to ride upon the upper ends of the tracks 50 and is rigidly attached to the conveyor 12 so that it can be conveyed thereby along the top of the coating station 118. The tracks 50 not only support the bushing block 52 and define a path through the booth 18, but they also extend downwardly along the neck 66 of the form 116 so as to mask a portion thereof and prevent powder from depositing thereupon. The masking effect creates an aperture in the article through which the flexible mold or form 116 can ultimately be removed, which in the bulb 10 illustrated in FIG. 1 is the end of the neck 11 thereof.

Rotatably supported and extending through the bushing block 52 is a hollow support tube 54, which projects along the depth of the tracks 50 and serves to support the neck 66 of the form 116 by insertion of the lower end thereinto. A pinion 56 is secured adjacent the upper end of the support tube 54, with a thin washer 53 therebetween, and the pinion 56 cooperates with the stationary rack 58; engagement of the teeth of the pinion 56 with the rack 58 when the bushing block 52 carries the assembly past the rack 58 results in rotation of the pinion 56, support tube 54 and form 116 so that a uniform coating is produced on all exposed surfaces of the latter.

A hose 60 connected to a pressure source (not shown) is secured to the end of the support tube 54 by conventional coupling means 55 so that the form 116 may be inflated or deflated as desired. A suitable electrical contact assembly 62 has a finger 63 bearing against and making wiping contact with the upper surface of the pinion 56. The source 64 of high voltage potential, which is diagrammatically illustrated, has one pole connected to the powder guns 44 and the other pole connected to the electrical contact assembly 62 so that powder passing through the guns 44 is charged to a polarity opposite to that to which the form 116 is charged, insulation being provided where necessary to avoid short circuiting (the body of the guns 44 illustrated are nonconductive for that purpose). A layer of conductive material 68 on the inside surface of the form 116 renders it electrically conductive.

As should now be evident, the illustrated electrostatic station 118 operates with the form 116 passing along the length of the slot in the top 34 of the enclosed chamber 30; while doing so, it rotates and is exposed to powder which is projected thereagainst under air pressure from the powder guns 44. By virtue of the opposite charges on the powder and the form 116, resulting from connection to the high voltage source 64, the powder is electrostatically attracted to and maintained on the surface of the form 116. Thereafter, the form 116 passes to a location at which the particles are integrated such as the oven 22 illustrated in FIG. 2.

Although only a single coating station is depicted in FIG. 2, in some instances it may be desirable to utilize a plurality of coating stations located sequentially along a travel path for the form. Such an arrangement could be used to advantage to produce articles having interior and exterior walls with different properties (e.g., for packaging applications), to manufacture articles of increased wall thickness, or for making articles which have printing and/or decorative effects by preferential masking.

The material utilized to coat the form may vary greatly, and comprise particulate solids. However, the material employed will dictate the type of equipment which is suitable for use at the coating, integration, and/or solidification stages of the process. Of the numerous types of materials which are suitable, thermoplastics, and particularly synthetic thermoplastic resins, are preferred, exemplary of which are the vinylidenes and vinyls (e.g., polystyrene and polyvinyl choride), the olefins (e.g., polyethylene, polypropylene and copolymers thereof), the cellulosics, polyamides (e.g., nylons), etc. Since the processability and flow characteristics of the material are much less significant in the present process than in conventional molding techniques, and since long exposure to high temperatures can be avoided, this process is ideally suited for the manufacture of articles from materials having relatively poor processing characteristics and heat stability. Moreover, by the present method, articles can readily be made of a combination of materials, and if the different materials are applied sequentially only one layer need be of an integrable material.

The material utilized for the bladder which serves as the form may also vary considerably and will depend considerably upon the type of material that is to be coated thereon, it being required in a general sense only that the material provide a bladder that is somewhat flexible. If the bladder is to be subjected to heat, either in a preheating step or in a subsequent step of fusion, the material used for the bladder must be essentially unaffected by the elevated temperatures to which it is exposed. Similarly, if the coating is to be applied by an electrostatic technique, provision must be made so that the bladder can be maintained at a suitable potential. Although it may be most convenient to utilize a material for the bladder which has inherent electrical conductivity when an electrostatic technique is to be employed, more conventional rubbers may be modified to provide the necessary level of conductivity. For example, such materials may be filled with metal or graphite, or may have metal or graphite deposited upon the interior surface thereof. In some cases, it will be desirable to reinforce the bladder for enhanced strength, and such reinforcement may be relied upon to provide the electrical conductivity. Other possibilities include the provision of a vacuum-deposited "metallized" surface on the exterior of the bladder which can be utilized for conductivity and which might also be transferable under heat to the interior of the article formed; in This manner, a metallized effect can be produced on the article if it is fabricated of a transparent material. Finally, it may be advantageous to circulate a liquid through the bladder for the purpose of heating, cooling, or inflation thereof, and such a liquid may be utilized to provide a conductive medium. If the bladder is to inflated, it should be produced of a material which possesses sufficient elasticity articles. Moreover to allow it to assume its original size and shape even after repeated cycles of inflation and deflation. articles"

The bladder will, of course, be properly configured for the particular article to be produced, of which ornaments and bottles are merely exemplary; the method and apparatus disclosed may be employed to produce a myriad of different articles. Moreover, although the invention may be most beneficially applied to the manufacture of articles which are nearly closed, the term "generally hollow articles" is intended to encompass relatively open articles from which removal of the form is considerably less difficult, but in which the collapsability feature is of benefit.

The method by which the bladder is produced is relatively insignificant to the invention and should not be construed to impose any limitations whatsoever thereupon; for example, it may be convenient to form the bladder in a destructible mold such as one made of wax, glass or other frangible material, or one constructed of a soluble substance for subsequent separation of the bladder and mold. A hollow mold may be used to cast or mold the bladder with the advantage that the mold need not be destroyed and can be utilized repeatedly.

With more particular reference to the apparatus employed, any suitable type of conveyor may be utilized in place of the chain conveyor, which is diagrammatically illustrated, to convey the forms between operating stations in a continuous method. Furthermore, such a conveyor can be dispensed with entirely and other means substituted therefor, or the molds may be transported manually between sequential stations. The heating means may be quite conventional and may be provided by convection, infrared or induction ovens, or, as has been suggested previously, it may be a heated liquid (e.g. an oil) which is passed through the bladder. Conventional cooling means may also be used, and may involve the use of air or other fluid at a relatively low temperature or a conventional refrigerant liquid. Such fluids may be used either externally or internally of the bladder, and the effect thereof may be either direct or indirect.

As has also been mentioned with respect to the description of the drawings, provision will normally be made, such as by masking a portion of the bladder, for creating an aperture in the article produced, although the aperture can be formed in a subsequent operation. The means for masking the bladder may be physical i.e., utilizing a structural barrier as a shield such as the tracks illustrated, or a masking effect may be achieved by using appropriately directed air jets, by brushing or by electrical repulsion when an electrostatic technique is involved. As an additional possibility, when the coating material is caused to adhere to the bladder by fusion thereof during a preliminary stage, or when it is subsequently heated, a heat-sink may be provided at the portion of the bladder on which the coating is not desired so that adherence does not occur or so that adhering material is readily removable. The heat-sink can be the member supporting the bladder, such as the support tube shown in FIG. 3, and it can be cooled internally, such as by water, air, or the like.

Although the term "fusion" as used herein will most generally relate to the effect induced at elevated temperatures as is consistent with its most literal meaning, a somewhat broader interpretation is intended to be applied to its use in describing the present invention. Thus, for example, treatment with solvent vapors and electron irradiation can be used to induce flow in certain materials, and in instances in which materials of those types are employed the term "fusion" is intended to encompass such techniques. Moreover, ultrasonic vibrations may be utilized to produce fusion of certain types of particles. As will be apparent, in such cases suitable equipment will be used instead of the oven depicted in the drawing; it will also be apparent that such techniques will permit other materials to be employed for the bladder, for example materials which are not well-suited to use at elevated temperatures. It is also possible to employ inherently integrable materials in the practice of the present invention, such as molten materials or solvent dispersions capable of solidification, in which event no fusion operation per se is necessary.

As regards the electrical circuitry employed for electrostatic coating, it will normally be quite conventional and modified only as may be necessitated by the particular application. It should be appreciated that the bladder need not be connected directly to the source of high voltage as is shown in the drawing; it may be grounded either independently or through other portions of the apparatus, which are desirably maintained at ground potential in accordance with recommended safe operating procedures.

It is a particularly advantageous feature of the invention that the apparatus employed may be used very conveniently to enhance the properties of the article produced. Thus, it is well known that the properties of certain resins, such as polypropylene, are improved by orientation of the molecules thereof along one or more axes, and the conditions for accomplishing such orientation are quite well known to those skilled in the art. In accordance with one embodiment of the present invention wherein the bladder is fabricated of an inflatable material, after the coating thereon has been brought to a suitable temperature, the molecules of the material can be multiaxially oriented simply by inflating the bladder to increase its dimensions and thus stretch the article thereon. The remaining steps of the method need not be modified in any way to achieve this desirable result.

At the completion of the method, the article need only be stripped from the bladder; such stripping is facilitated, as has been mentioned previously, by creating an aperture in the article during coating by appropriate masking. If the opening is at least about one-fourth the size of the largest cross-sectional dimension of the bladder, and if the bladder is reasonably flexible, it can normally be pulled directly from the article. However, if characteristics of the article or the bladder render separation more difficult, air jets or the like can be employed to collapse, vibrate and lubricate the bladder to facilitate its removal, or a lubricating material can be injected between the bladder and the article for the same purpose. Additional possibilities to facilitate separation include rotation of the bladder relative to the article and the use of a vacuum which should be applied gradually so as not to rip the bladder. In some instances, the other advantages of the invention may render it of sufficient value so that the destruction of the bladder to effect its removal will not be a significant disadvantage; however, it will usually be more desirable to preserve the bladder for repeated use. The means used to actually extract the bladder from the article may vary widely, the inclined fork or bifurcated member illustrated in the drawing merely being exemplary.

Illustrative of the efficacy of the present invention is the following specific example.

EXAMPLE ONE

A conventional 2½-inch round Christmas tree ornament was utilized as a destructible model. A plastic tube was fitted over the neck of the ornament and it was then coated with nylon powder in an electrostatic fluidized bed. When a coating of about one thirty-second to one sixteenth inch was built up (in several sequential coating and fusing operations), the interior glass ball was broken by flexing the nylon shell and the fragments thereof removed; the shell was utilized as a mold in subsequent operations.

After coating the inside of the nylon mold with a release agent, a liquid silicone polymer was poured into it; the mold was rotated to ensure complete coverage and then inverted and drained. Thereafter, the mold was heated for 15 to 30 minutes at 100° Centigrade to cure the polymer, cooled, and the bladder so produced was removed by blowing air between it and the mold. The wall thickness of the finished bladder was about 0.005 to 0.01 inch.

Powdered graphite was then poured into the bladder and rubbed on the inside wall thereof to provide an electrically conductive surface. The bladder was thereafter adhesively secured on a heavy-walled tube inserted into the neck thereof just far enough so that one end coincided with the point where the ornament's neck was to terminate. The tube functioned as a heat-sink so that, after a subsequent fusing step, the powder on the bladder adjacent the tube end could be removed easily.

The tube in the neck of the bladder was electrically grounded, and the bladder and tube were then axially rotated in a grounded electrostatic fluidized bed for a period of about 5 to 10 seconds. The powder used for coating was clear polyvinyl chloride resin, although other vinylidene and olefin polymers have also been used successfully. After removing the coated bladder from the fluidized bed, it was rotated in a convection oven at about 450° Fahrenheit for a period of about 3 minutes to fuse and integrate the particles into a unified article. The bladder with the article on it was then cooled under ambient conditions for about 2 minutes and compressed air was directed at the terminus of the neck of the ornament. Partially fused powder was thereby removed and the bladder was collapsed somewhat under the air force. Upon removal of the bladder through the neck of the article there was obtained a Christmas tree ornament of substantially the same dimensions as the original ornament utilized as the mold.

Thus, it can be seen the present invention provides a method for producing generally hollow articles in a manner which is rapid, facile and relatively inexpensive. It permits the production of articles of relatively complex design in a limited number of operations, and the articles are formed without seams and with walls of controlled thickness. Materials which are relatively inexpensive and/or difficult to fabricate utilizing conventional molding techniques may be employed in accordance with the present method, and orientation of the molecules in the article produced may readily be accomplished to improve the properties thereof. The invention also provides apparatus which is particularly suited to the accomplishment of the objects of the invention, and the apparatus is simple in design and relatively inexpensive.

Having thus described the invention, I claim:

1. In a method of producing a generally hollow article, the steps comprising: forming a cloud of electrically charged integrable particles; disposing in proximity to said cloud of charged particles a flexible bladder comprised of a material that is responsive to means acting thereon to promote adhesion of charged particles coming into contact therewith; acting upon said bladder to temporarily promote particle adhesion thereto and to induce attraction of particles thereto by steps including maintaining said bladder at an electrical potential charging it effectively opposite to said particles to induce said attraction; integrating said particles on said bladder into a cohesive, unitary, generally hollow article; terminating said action upon said bladder and at least partially collapsing said bladder to facilitate the release and removal thereof from said article.

2. The method of claim 1 wherein said particles are of a synthetic thermoplastic resin.

3. The method of claim 2 wherein said step of acting upon said bladder additionally includes preheating to an elevated temperature sufficient to at least partially fuse said particles and cause adherence thereof to said bladder upon contact therewith, said responsive material providing to said bladder a heat capacity sufficient to maintain said bladder at a relatively high temperature after said preheating step 4. The method of claim 1 wherein said method includes the steps of heating said particles on said bladder to a temperature sufficient to effect the integration thereof, and subsequently cooling said integrated particles into said cohesive, self-supporting article.

5. The method of claim 1 wherein said responsive material of said bladder is electrically conductive, and wherein said step of charging said bladder promotes adhesion as well as inducing attraction of said particles thereto.

6. The method of claim 5 wherein said responsive material is finely defined and is selected from the group consisting of electrically conductive metals and graphite.

7. The method of claim 1 wherein said method includes a step of masking a portion of the surface of said bladder to substantially avoid adherence of said particles on said bladder so that the article produced has an opening through which said bladder-removal step can be effected.

8. The method of claim 5 wherein a portion of the surface of said bladder is maintained at a potential different from the remainder thereof so as to reduce adherence of said particles on said portion and to provide an opening in said article through which said bladder removal step is effected.

9. The method of claim 1 wherein said bladder is inflatable and is maintained in an inflated condition during said disposing and integrating steps.

10. The method of claim 1 wherein said particles are of an orientable material and said bladder is inflatable, and wherein said method includes the step of inflating said bladder to increase the dimensions thereof after said article is formed, to orient the molecules of said material.